(12) United States Patent
Siegel

(10) Patent No.: US 6,298,440 B1
(45) Date of Patent: Oct. 2, 2001

(54) METHOD AND SYSTEM FOR PROVIDING MULTIPLE ENTRY POINT CODE RESOURCES

(75) Inventor: Matthew R. Siegel, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/231,287

(22) Filed: Apr. 22, 1994

(51) Int. Cl.[7] .................................................. G06F 15/177
(52) U.S. Cl. ................................................ 713/1; 709/331
(58) Field of Search ................................ 395/700; 713/1, 713/2, 100; 709/310–332

(56) References Cited

U.S. PATENT DOCUMENTS 5,375,241 * 12/1994 Walsh ..................................... 709/331

OTHER PUBLICATIONS

Thelen, Randy, "Under The Hood: The Power Mac's Run—Time Architecture:" Byte, Apr. 1994, p. 131 vol. 19 No. 4.*
DiLascia, Paul, Questions and answers: C/C++ (Programming Languages) Microsoft Systems Journal, Jul. 1993, V8, N7, p 83(5).*
Lefor, John, A.; Lund, Karen "Reaching into Expanded Memory (Software Design to Access Expanded Memory)", PC Tech Journal, V5, N5, p100(15) May 1987.*
Eric Shapiro and Tom Thompson, "The Mac Extended: The Mac Operating System's Modular Design Lets Savvy Programmers Add New Features", Byte, Jul. 1993, p. 205.*
Petzold, C., "Programming Windows," Microsoft Press, Redmond, Washington, 1990, pp. 877–915.

* cited by examiner

Primary Examiner—St. John Courtenay, III
(74) Attorney, Agent, or Firm—Kilpatrick Stockton LLP

(57) ABSTRACT

An improved method for initializing an auxiliary code resource is provided. In a preferred embodiment of the present invention, a computer system has a multiple entry point code resource consisting of a main code resource, which contains global variables, and a plurality of auxiliary code resources. The method of the first aspect of the present invention provides for loading the auxiliary code resource into memory, searching the auxiliary resource for markers and, upon locating the markers, storing a reference to the global variables into the sequence of markers.

7 Claims, 4 Drawing Sheets

METHOD AND SYSTEM FOR PROVIDING MULTIPLE ENTRY POINT CODE RESOURCES

FIELD OF THE INVENTION

The present invention relates generally to a method for accessing functions in a computer system, and more specifically, to a method for accessing functions in a multiple entry point code resource.

BACKGROUND OF THE INVENTION

Code resources consist of functions that are invoked by a calling computer program ("calling program"). These functions are referred to as the component functions of the code resource. Code resources are linked with the calling program at runtime, but the calling program is not directly linked to the component functions.

In order for a calling program to use a code resource, the calling program uses the following procedure. First, the calling program loads the code resource into the allocated memory space of the calling program. Second, the calling program accesses and uses whichever component functions are desired. Finally, when the code resource is no longer needed, the code resource is purged from the allocated memory space of the calling program.

Typically, code resources contain one entry point to a dispatcher through which a calling program can access the component functions. The dispatcher is a function within the code resource. Therefore, a calling program cannot typically directly access the component functions of the code resource. Instead, when a calling program wants to execute a component function, the calling program invokes the dispatcher, passing an identifier of the requested component function as well as the parameters for the requested component function. The dispatcher determines the address of the component function and then invokes the component function, passing the parameters. Accessing component functions in this way ("indirectly") increases processing time, thereby degrading system performance.

FIG. 1 depicts a conventional code resource. The code resource consists of a main code resource 101 and auxiliary code resources 105, 106. The auxiliary code resources 105, 106 are code resources referred to by the main code resource 101. The main code resource contains a dispatcher 102, global variables 103, component functions 107, 108 and a jump table 104. The dispatcher 102 acts as the single entry point into the main code resource 101. The global variables 103 are variables that can be accessed by functions in either the main code resource 101 or the auxiliary code resources 105, 106. The jump table 104 contains entries that point to each component function contained in the auxiliary code resources 105, 106. A code resource that consists only of a main code resource is referred to as a single-segment code resource and a code resource with a main code resource and at least one auxiliary code resource is referred to as a multiple-segment code resource.

Using a prior "indirect access" method, a calling program 100 first loads the main code resource 101 into memory and performs a code resource initialization function. Next, the initialization function saves the base address of the main code resource 101 so that the component functions can access the global variables 103, which are at a fixed offset within the main code resource 101. The calling program 100 then calls the component functions of the code resource indirectly through the dispatcher 102.

To call a component function, the calling program 100 invokes the dispatcher 102 passing an identifier of the requested component function and the parameters for the requested component function. The dispatcher 102, in turn, invokes the requested component function passing the parameters. If the requested component function is contained within the main code resource 101, then the dispatcher 102 can simply invoke the component function passing the parameters. However, if the requested component function is contained in an auxiliary code resource 105, 106, then the dispatcher 102 loads the auxiliary code resource 105, 106 into memory (if not already loaded) and then calls the requested component function passing the parameters. An additional parameter passed to the component functions in an auxiliary code resource is the base address of the main code resource 101. The base address parameter allows the component functions of the auxiliary code resource to access the global variables 103 in the main code resource 101.

Another prior system provides direct access to component functions. The direct access prior system differs from typical prior systems in the way that the initialization function works and the way that the dispatcher works. In the direct access prior system, the initialization function of the calling program loads the main code resource into memory, determines the base address of the loaded main code resource, searches for a sequence of instructions and stores the base address at the location of the second and third instructions. Storing the base address in this way allows component functions in the main code resource to use global variables by executing the sequence of instructions to obtain the base address of the main code resource. The dispatcher of the direct access prior system can be requested to return the address of a component function. Thus, a calling program can use component functions directly. However, in using the direct access prior system, component functions which use global variables must reside within the main code resource because the main code resource is where the global variables are stored and the component functions in auxiliary code resources do not have access to the main code resource. Therefore, when using the direct access prior system, component functions in auxiliary code resources cannot use global variables.

SUMMARY OF THE INVENTION

In accordance with a first aspect of the present invention, a method is provided for initializing an auxiliary code resource. In accordance with the method of the first aspect of the present invention, the computer system has a multiple entry point code resource consisting of a main code resource, which contains global variables, and a plurality of auxiliary code resources. The method of the first aspect of the present invention provides for loading the auxiliary code resource into memory, searching the auxiliary resource for a sequence of markers in which the markers are specific instructions, and, upon locating the markers, storing a reference to the global variables into the sequence of markers.

In accordance with a second aspect of the present invention, a method is provided for implementing functions in a multiple entry point code resource having a main code resource. In accordance with the method of the second aspect of the present invention, a computer system contains a multiple entry point code resource, a resource pointer, and a get base address component. The method of the second aspect of the present invention provides for invoking the get base address component to obtain a base address of the main code resource and adjusting the resource pointer to ensure that the resource pointer contains an appropriate value.

DETAILED DESCRIPTION OF THE INVENTION

The preferred embodiment of the present invention provides a method and system for implementing multiple entry point code resources. The preferred embodiment of the present invention provides for both single-segment and multiple-segment, multiple entry point code resources which allow a calling program to access component functions directly. By allowing direct access, the preferred embodiment of the present invention substantially reduces processing time. The preferred embodiment of the present invention also allows component functions in auxiliary code resources to reference global variables in a seamless and efficient manner. In addition, the preferred embodiment ensures that the resource file pointer is set correctly for each component function in a multiple entry point code resource to provide reliability.

A code resource with multiple entry points allows the calling program to access each component function directly. In a multiple entry point code resource ("merc"), the overhead associated with a single entry point code resource is absent; processing is much faster because the desired component function is referenced directly through the address of the component function. A merc, thus, saves the steps of having to pass parameters to a dispatcher and then having the dispatcher call the component function.

Figure 1:
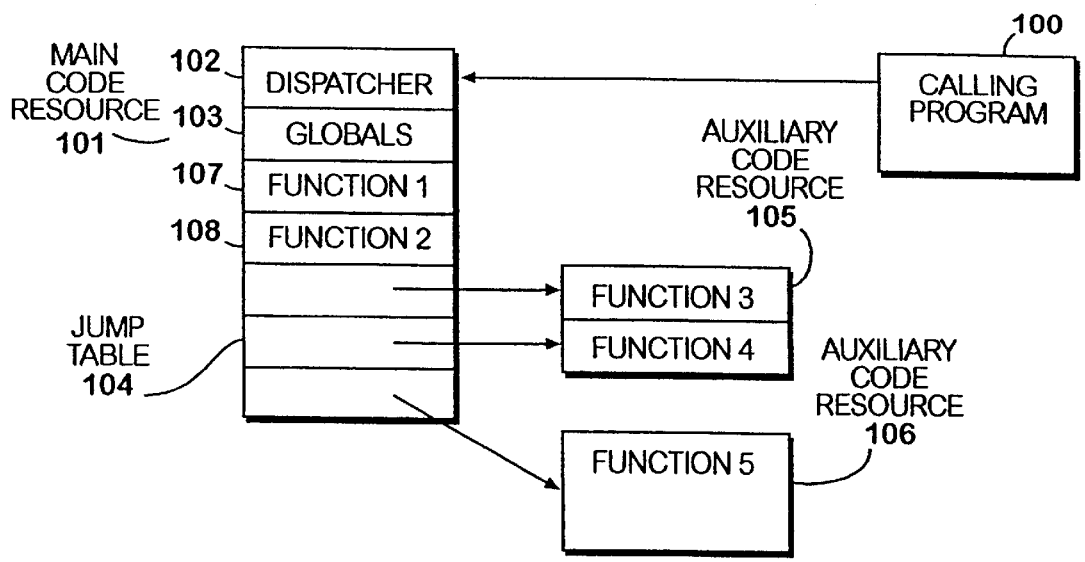
FIG. 1 depicts a conventional single entry point code resource.
Figure 2:
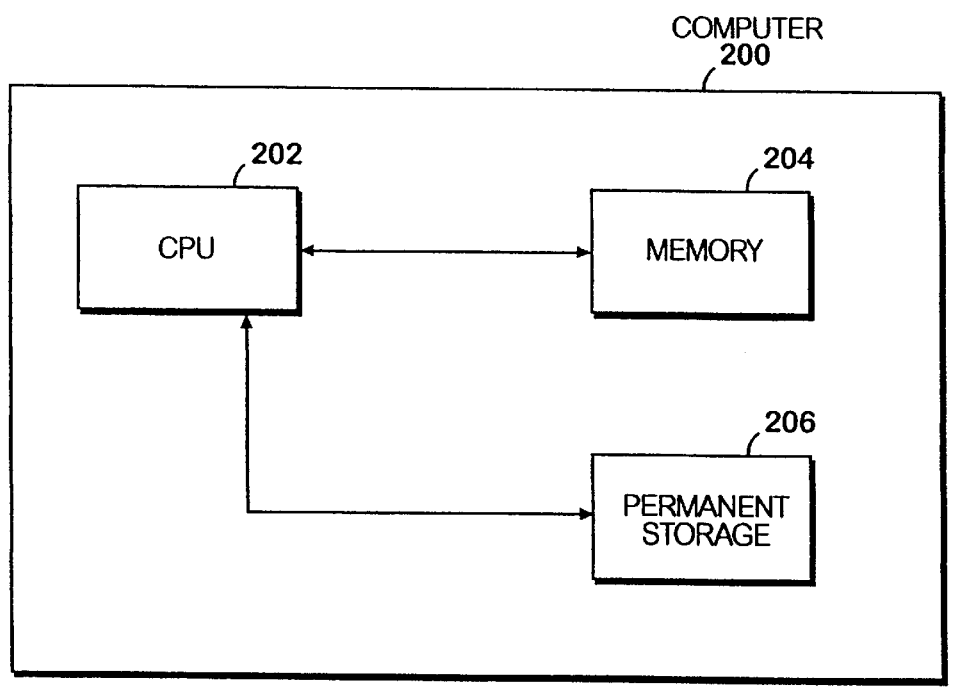
FIG. 2 depicts a computer system suitable for practicing the preferred embodiment of the present invention.

FIG. 2 depicts a computer system suitable for practicing the preferred embodiment of the present invention. The computer 200 has a memory 204, a permanent storage 206, and a central processing unit (CPU) 202. The CPU 202 accesses information in the permanent storage 206 and stores the information into the memory 204. The information can be computer programs or data. Once stored in the memory 204, the CPU 202 executes the computer programs and accesses the data. One skilled in the art will appreciate that a computer system suitable for practicing the referred embodiment of the present invention can contain other components.

Figure 3:
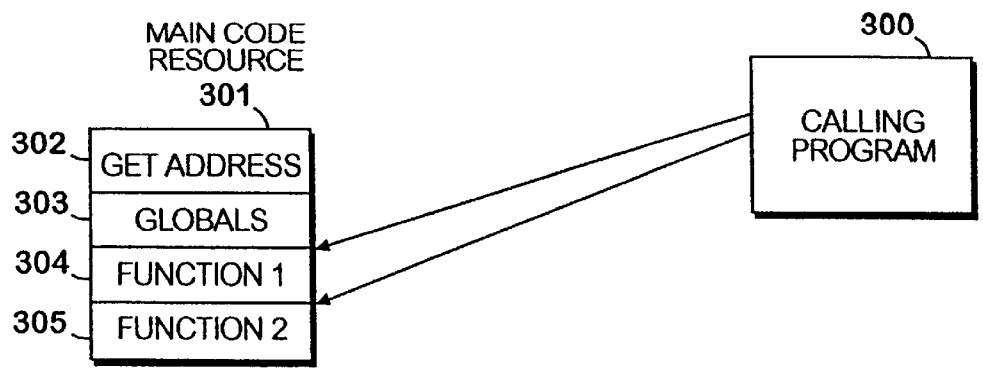
FIG. 3 depicts a single-segment, multiple entry point code resource of the preferred embodiment of the present invention.

FIG. 3 depicts a single-segment merc. The main code resource 301 contains a "get address" routine 302, global variables 303, and component functions 304, 305. The get address routine 302 is responsible for determining the address of a requested component function and returning the address of the requested component function to a calling program 300. Thus the get address routine 302 acts as an initial entry point to the code resource. When a calling program 300 wishes to invoke a component function, the calling program 300 loads the main code resource 301 into memory. Next, the calling program 300 requests the address of the component function that the calling program 300 wishes to invoke by invoking the get address routine 302. After receiving the address of the requested component function, the calling program 300 may call the component function directly. When the calling program 300 has completed using the code resource, the calling program 300 purges the main code resource 301 from the allocated memory of the calling program 300.

Figure 4:
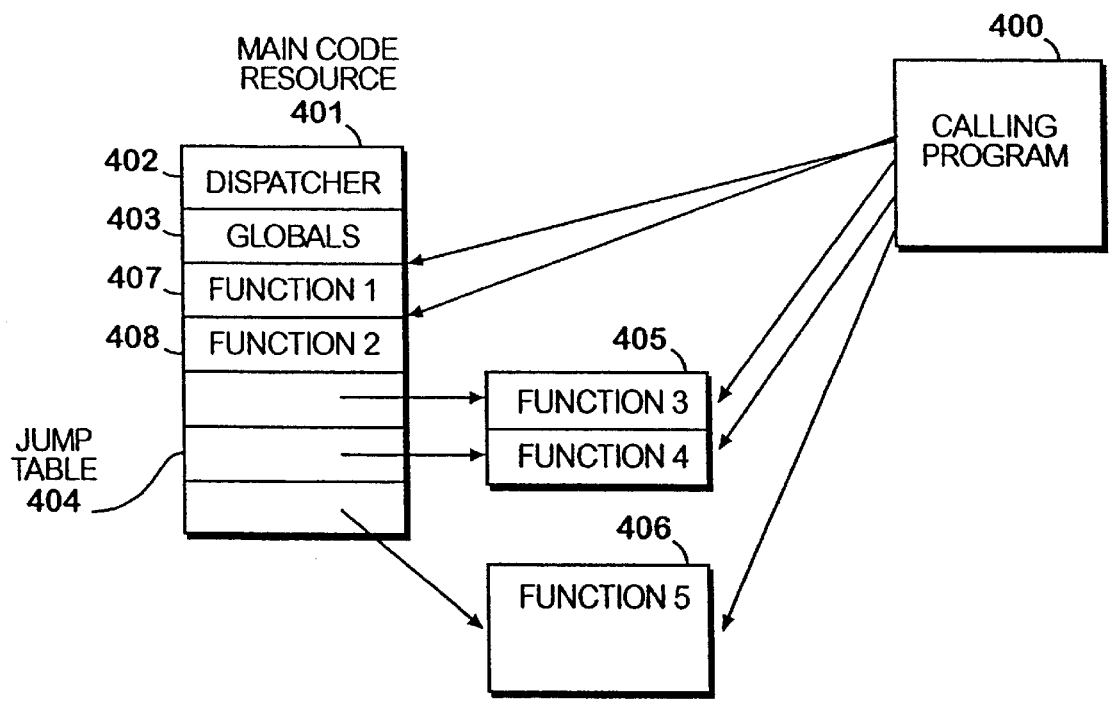
FIG. 4 depicts a multiple-segment, multiple entry point code resource of the preferred embodiment of the present invention.

FIG. 4 depicts a multiple-segment merc. In a multiple-segment configuration, there is a main code resource 401 and auxiliary code resources 405, 406. The main code resource 401 contains component functions 407, 408, global variables 403, a get address routine 402, and a jump table 404. The jump table 404 contains one entry for each component function in the auxiliary code resources 405, 406. Each entry in the jump table 404 contains a reference to the corresponding component function.

Similar to a single-segment merc, when a calling program 400 wishes to invoke a component function of a multiple-segment merc, the calling program 400 first loads the main code resource 401 into memory. Next, the calling program 400 requests the address of a component function by invoking the get address routine 402. The get address routine 402 determines whether the requested component function is contained within the main code resource 401 or within an auxiliary code resource 405, 406. If the requested component function is contained within the main code resource 401, the address of the requested component function is returned to the calling program 400. However, if the requested component function is contained within an auxiliary code resource 405, 406, the get address routine 402 accesses the jump table 404 to determine which auxiliary code resource 405, 406 contains the requested component function, loads the auxiliary code resource into memory (if not already loaded), determines the base address of the auxiliary code resource, computes the address of the requested component function, and returns the address of the requested component function to the calling program 400.

Figure 5:
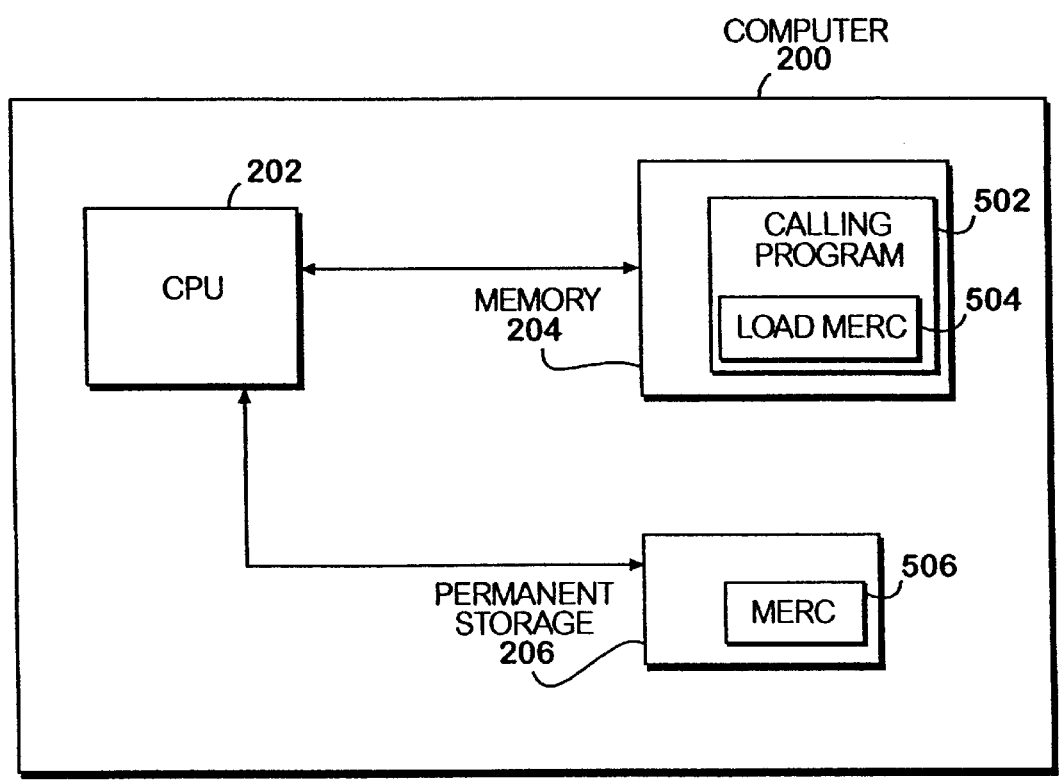
FIG. 5 depicts a more detailed diagram of a computer system suitable for practicing the preferred embodiment of the present invention.

In order to perform the above-described functionality, the preferred embodiment of the present invention provides the load merc routine and the get address routine. To use a merc, a calling program first calls the load merc routine. The load merc routine loads the main code resource into memory and initializes the main code resource. FIG. 5 depicts a more detailed diagram of a computer system 200 suitable for practicing the preferred embodiment of the present invention. The load merc routine 504 resides within the address space of a calling program 502. The merc 506 initially resides within the permanent storage device 206 until the load merc routine 504 loads the merc into memory 204.

Figure 6:
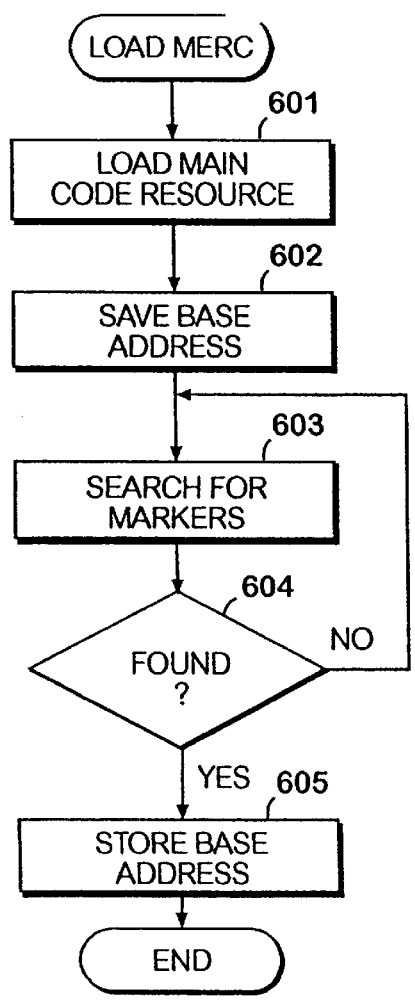
FIG. 6 depicts a flowchart of the steps performed by the load merc routine of the preferred embodiment of the present invention.

FIG. 6 is a flow chart of the steps performed by the load merc routine of the preferred embodiment. The load merc routine loads the main code resource into memory and stores the base address of the main code resource into a sequence of markers so that the base address can be accessed for use when a component function in the main code resource refers to global variables. The sequence of markers are instructions contained in a "get base address" procedure. In order to obtain the base address of the main code resource, a component function invokes the get base address procedure. The get base address procedure is depicted in Code Table 1. Using typical prior methods, since the invocation of component functions is through the dispatcher, the component functions have access to the base address of the main code resource because the base address is passed into the component function as a parameter. Although the preferred embodiment invokes the get base address procedure to obtain the base address, the impact on processing time is minimal and the advantage of having direct access more than makes up for this minimal impact. In step 601, the load merc routine loads the main code resource into memory. In step 602, the load merc routine saves the base address of the main code resource. In step 603 and 604, the load merc routine searches for a sequence of markers. Although the present invention is described as searching for one sequence of markers, one skilled in the art will appreciate that the present invention can be used with multiple sequences of markers. In a preferred embodiment, the markers consist of four instructions: a jump instruction, two null instructions and a move instruction ("Jmp PC+4"; "0"; "0"; and "Move PC−4, A1"). One skilled in the art will appreciate that other markers could equivalently be used to identify a location at which to store the base address. Alternatively, the base address could be stored at a predefined location in a main code resource. In step 605, when the load merc routine encounters the markers, the load merc routine overwrites the second and third instructions (both being null) with the base address of the main code resource. Storing the base address using this method allows component functions in the main code resource to access the base address of the main code resource at any time. Therefore, whenever a component function in the main code resource refers to a global variable, the component function invokes the get base address procedure to obtain the base address of the main code resource and adds the base address of the main code resource to a predefined offset (representing the location of the global variable within the main code resource) to determine the address of that global variable.

Code Table 1
Get_Base_Address
{
JMP+4;
0;
0;
Move PC-4, A1;
Return;
}

Figure 7:
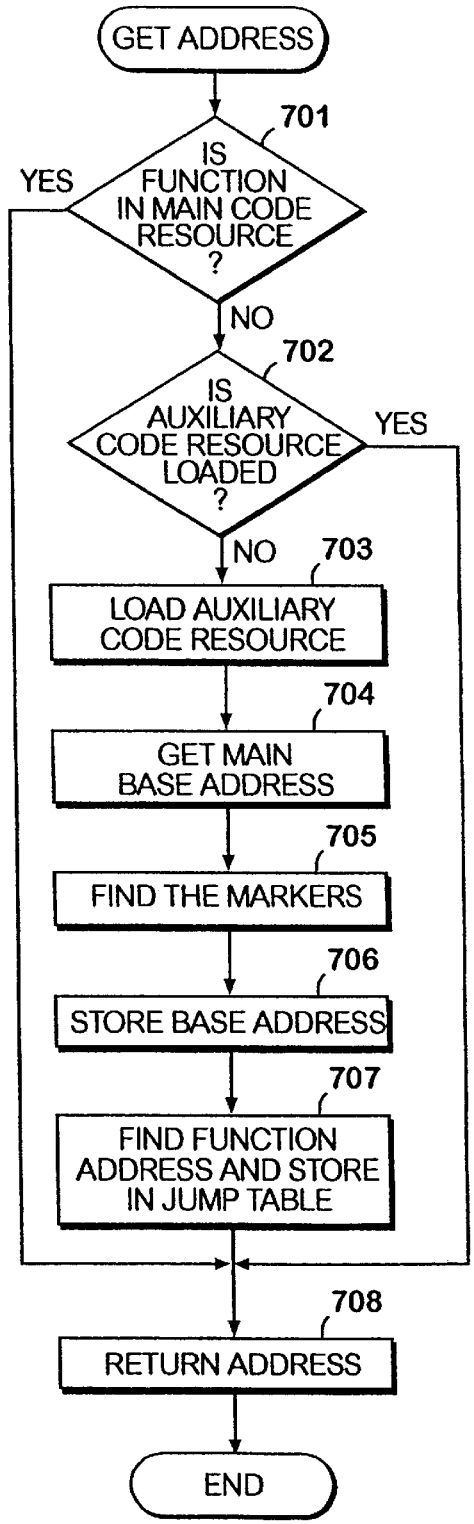
FIG. 7 depicts a flowchart of the steps performed by the get address routine of the preferred embodiment of the present invention.

The get address routine is invoked by a calling program to obtain an address of a component function so that the calling program may call the component function directly. FIG. 7 depicts a flow chart of the steps performed by the get address routine of the preferred embodiment. In steps 701 and 708, when the address of a requested component function is in the main code resource, the get address routine only has to return the address of the component function. In step 702, when the address of a component function that is not in the main code resource is requested, the get address routine determines if the auxiliary code resource in which the component function is located has been loaded. In step 708, if the auxiliary code resource has been loaded, the address of the component function is returned. In step 703, if the auxiliary code resource has not been loaded, the appropriate auxiliary code resource is loaded into memory. The get address routine determines which auxiliary code resource contains the requested component function by accessing the jump table entry for the requested component function. The jump table entry for a component function in an auxiliary code resource initially contains an identifier which is used to locate the auxiliary code resource and the location of the requested component function within the auxiliary code resource. After an entry in the jump table has been accessed once, as described below, the entry contains the address of the component function. In step 704, the get address routine determines the base address of the main code resource by locating the memory location from within the main code resource where the base address was stored during initialization. In step 705, the get address routine searches the auxiliary code resource for four specific instructions ("Jmp PC+4"; "0"; "0"; and "Move PC−4, A1"). In step 706, the get address routine stores the base address of the main code resource at the location of the second and third instructions. These instructions are contained within a procedure ("get base address") that resides within the auxiliary code resource. When a component function in the auxiliary code resource references a global variable, the component function invokes the get base address procedure to obtain the base address of the main code resource and then adds a global variable offset to the base address of the main code resource to determine the memory location wherein the global variable resides. In step 707, the get address routine locates the address of the component function and stores the address of the component function into the jump table. In step 708, the address of the component function is returned.

In an alternative embodiment of the get address routine, the get address routine provides selective access to component functions. Thus, upon invocation, the get address routine of the alternative embodiment first determines if the calling program is allowed access to a requested component function. This determination is made by the get address routine per specific instructions. That is, the get address routine is implemented to only provide access to calling programs of a certain type and name. The get address routine of the alternative embodiment determines the type and name of a calling program by querying the operating system. Querying the operating system to determine the type and name of a calling program is well-known in the computer industry. Thus, by using the alternative embodiment of the get address routine, a manufacturer of software products may control access to the multiple entry point code resource.

Figure 8:
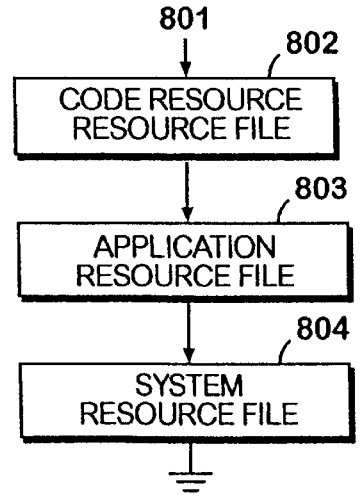
FIG. 8 depicts a typical resource pointer and the resource files pointed to by the resource pointer.

The preferred embodiment also addresses problems associated with a resource pointer of the computer system. The resource pointer is a pointer to a resource file that is used to resolve references to resources. Examples of resources found in a resource file include: a code segment, a device driver, an icon or a menu definition procedure. Upon referring to a resource in a program, the resource file is examined to determine where the resource is defined so that the program may make use of the resource. FIG. 8 depicts a typical resource pointer and the resource files pointed to by the resource pointer. The resource pointer 801 points to a singly linked list of resource files that are each searched in order. The typical order in the linked list is as follows: the system resource file 804 is at the end of the list, the calling program resource file 803 is located in the middle, and the code-resource resource file 802 is at the head of the list. In order for the code resource to operate correctly, the resource pointer 801 should be pointing to the resource file of the code resource 802. Otherwise, if the resource pointer were pointing to, for example, the calling program resource file 803, only the calling program resource file 803 and the system resource file 804 would be searched for resource references (in that order). Therefore, the references of the code resource would be overlooked and remain unresolved, which would cause the code resource to operate in an undesirable manner. In some computer systems, upon invocation of a component function, the resource pointer is set randomly and, thus, may not be pointing to the appropriate resource file.

A preferred embodiment of the present invention solves the resource pointer problem in each component function. Upon invoking a component function, the component function saves the value of the resource pointer, overwrites the resource pointer with the address of the resource pointer of the code resource, and, upon completion of the component function, restores the original value of the resource pointer. The preferred embodiment ensures that while executing a component function, the resource pointer is pointing to the appropriate resource file. A sample component function is shown in Code Table 2:

Code Table 2

Example_Function
{
/*Get the base address of the main code resource in order to calculate
the address of global variables. */
Get_Base_Address;
Save the resource pointer value into a variable "Variable 1"
Overwrite the resource pointer with a pointer to the code resource's
pointer
/* Main body of the component function */
Variable2=2+2:
Overwrite the resource pointer with the contents of "Variable 1"
return to calling program.
}

While the present invention has been described with reference to a preferred embodiment thereof, those skilled in the art will know of various changes in form that may be made without departing from the spirit and scope of the claimed invention as defined in the appended claims.

What is claimed is:

1. In a computer system, the computer system having a multiple entry point code resource, the multiple entry point code resource comprising a main code resource and an auxiliary code resource, the main code resource having global variables, the auxiliary code resource having functions, a method for initializing an auxiliary code resource comprising the computer-implemented steps of:
loading the auxiliary code resource into memory;
searching the loaded auxiliary code resource for a sequence of markers; and
storing a reference to the global variables into the sequence of markers so that when a function is invoked, the function can access the global variables using the stored reference.

2. In a computer system, the computer system having a memory and a multiple entry point code resource, the multiple entry point code resource having functions, a main code resource and an auxiliary code resource, the main code resource having a base address, the auxiliary code resource having a marker, a method for accessing a function in the multiple entry point code resource, comprising the computer-implemented steps of:
receiving a request for an address of a function;
determining the location of the function;
when the function is located within the auxiliary code resource,
loading the auxiliary code resource into the memory of the computer system;
searching for the marker within the auxiliary code resource; and
storing the base address of the main code resource into the auxiliary code resource at the location of the marker so that the base address of the main code resource can be accessed by functions in the auxiliary code resource; and
returning the address of the function.

3. The method of claim 2 wherein a computer program requests the address of a function, including the steps of:
determining whether the computer program is allowed access to the requested function; and
returning the address of the requested function when the calling program is allowed access to the requested function.

4. In a computer system, the computer system having a memory and a multiple entry point code resource, the multiple entry point code resource having a main code resource and an auxiliary code resource, the main code resource and the auxiliary code resource having a marker, a method for loading a multiple entry point code resource into the memory of the computer system comprising the computer-implemented steps of:
loading the main code resource into the memory of the computer system at a base address;
searching for the marker within the main code resource;
storing the base address of the main code resource at a memory location indicated by the marker within the main code resource;
loading the auxiliary code resource into the memory of the computer system;
searching for the marker within the auxiliary code resource; and
storing the base address of the main code resource at a memory location indicated by the marker within the auxiliary code resource.

5. A computer system for invoking a function in a multiple entry point code resource, the computer system having memory, the computer system comprising:
a loader component for loading the multiple entry point code resource into the memory of the computer system, wherein the multiple entry point code resource has a main code resource and an auxiliary code resource, and wherein the main code resource has global variables;
a search component for locating a sequence of markers within the loaded auxiliary code resource; and
a storage component for storing a reference to the global variables into the located sequence of markers.

6. A computer-readable medium whose contents cause a computer system to initialize an auxiliary code resource, the computer system having a multiple entry point code resource, the multiple entry point code resource comprising a main code resource and an auxiliary code resource, the main code resource having global variables, the auxiliary code resource having functions, by performing the steps of:
loading the auxiliary code resource into memory;
searching the loaded auxiliary code resource for a sequence of markers; and
storing a reference to the global variables into the sequence of markers so that when a function is invoked, the function can access the global variables using the stored reference.

7. A computer-readable medium whose contents cause a computer system to access a function in a multiple entry point code resource, the multiple entry point code resource having functions, a main code resource and an auxiliary code resource, the main code resource having a base address, the auxiliary code resource having a marker, a method for accessing a function in the multiple entry point code resource, by performing the steps of:

receiving a request for an address of a function;

determining the location of the function;

when the function is located within the auxiliary code resource, loading the auxiliary code resource into the memory of the computer system;

searching for the marker within the loaded auxiliary code resource; and storing the base address of the main code resource into the auxiliary code resource at the location of the marker so that the base address of the main code resource can be accessed by functions in the auxiliary code resource; and returning the address of the function.

* * * * *